United States Patent
Seddik et al.

(10) Patent No.: US 7,903,143 B2
(45) Date of Patent: Mar. 8, 2011

(54) SYSTEMS AND METHODS FOR DOCUMENT SCANNING USING A VARIABLE INTENSITY DISPLAY OF AN INFORMATION HANDLING SYSTEM

(75) Inventors: Kareem S. Seddik, Round Rock, TX (US); Mark J. Fernandes, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 532 days.

(21) Appl. No.: 12/075,793

(22) Filed: Mar. 13, 2008

(65) Prior Publication Data

US 2009/0231483 A1   Sep. 17, 2009

(51) Int. Cl.
*H04N 5/225* (2006.01)
(52) U.S. Cl. .................... 348/207.99; 348/373
(58) Field of Classification Search ........... 348/207.996, 348/373–376, 207.99; 345/84–104; 362/97.1, 362/600; 315/209 R, 224, 276, 291, 307
See application file for complete search history.

(56) References Cited

U.S. PATENT DOCUMENTS

| | | | |
|---|---|---|---|
| 4,455,018 A | 6/1984 | Colglazier et al. | |
| 5,109,572 A | 5/1992 | Park | |
| 5,115,374 A | 5/1992 | Hongoh | |
| 5,625,469 A | 4/1997 | Wheeler et al. | |
| 5,920,401 A * | 7/1999 | Street et al. | 358/400 |
| 6,141,025 A * | 10/2000 | Oka et al. | 345/531 |
| 6,141,052 A | 10/2000 | Fukumitsu et al. | |
| 6,504,626 B1 * | 1/2003 | Shih | 358/442 |
| 6,812,958 B1 * | 11/2004 | Silvester | 348/207.1 |
| 6,903,725 B2 * | 6/2005 | Nacson | 345/163 |
| 7,206,181 B2 * | 4/2007 | Kimura | 361/170 |
| 7,542,178 B2 * | 6/2009 | Youden | 358/474 |
| 2006/0222311 A1 * | 10/2006 | Ohtake | 385/146 |
| 2007/0103934 A1 * | 5/2007 | Keh et al. | 362/612 |
| 2008/0174544 A1 * | 7/2008 | Ueda et al. | 345/102 |
| 2009/0122001 A1 * | 5/2009 | Cheung et al. | 345/102 |

OTHER PUBLICATIONS

Copending Application, Tze Chung et al., "Systems And Methods For Enhancing Image Quality Of A Web Camera Image", U.S. Appl. No. 11/962,450, filed Dec. 21, 2007; 21 pgs.
Copending Application, Erin Price et al., "Systems And Methods For Backlighting Image Displays", U.S. Appl. No. 11/821,560, filed Jun. 22, 2007, 41 pgs.
Copending Application, Ben Tan et al., "Systems And Methods For Compensating Brightness Uniformity Of Backlit Image Displays", U.S. Appl. No. 11/906,152, filed Sep. 28, 2007, 29 pgs.

* cited by examiner

*Primary Examiner* — Nhan T Tran
*Assistant Examiner* — Tuan H Le
(74) *Attorney, Agent, or Firm* — O'Keefe, Egan, Peterman & Enders LLP

(57) ABSTRACT

Variable display lighting intensity of an information handling system, such as notebook computer, is used to achieve image lighting uniformity for document scanning with a camera that is integrated or otherwise attached or built-in to a display of the information handling system.

20 Claims, 8 Drawing Sheets

US 7,903,143 B2

SYSTEMS AND METHODS FOR DOCUMENT SCANNING USING A VARIABLE INTENSITY DISPLAY OF AN INFORMATION HANDLING SYSTEM

FIELD OF THE INVENTION

This invention relates generally to document scanning and, more particularly, to document scanning using an information handling system such as a notebook computer.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems in the form of notebook computers are often provided with a top-mounted digital camera integral to the lid of the notebook computer and centered above the LCD display. The resolution of such cameras is often sufficient to capture high quality images.

SUMMARY OF THE INVENTION

Disclosed herein are systems and methods for utilizing variable display lighting intensity of an information handling system display, such as notebook computer, to achieve image lighting uniformity for document scanning with a camera that is integrated or otherwise attached or built-in to a display of the information handling system. Using the disclosed systems and methods, documents may be scanned to produce uniform scanned document images, despite the placement of such display cameras and attendant lighting conditions that would otherwise make successful document scanning operations difficult or impossible using the built-in camera of the information handling system.

In one exemplary embodiment, the disclosed systems and methods may be implemented using software and dynamic LCD screen gradient lightning of a notebook computer to transform a built in camera of the notebook computer into a document scanning device. For example, a document to be scanned may be placed flat on the user input or keyboard area of a notebook computer that has a LCD display with built-in top-mounted camera. Document guides may be built into the user-input surface to ensure that the document is correctly centered on the user-input surface for scanning. The LCD display screen may be tilted downward toward the user input area until the display is at an angle such that the top-mounted camera is positioned directly above the center of the document. The camera may then be tilted or swiveled downward so that it is pointing straight downward at the document to be scanned, and the camera may be configured to be capable of sharply focusing on the document text in this position while at the same time having a sufficiently wide field of view and resolution to capture the entire document to be scanned at an image resolution that is suitable for the given scanning application. A display locking mechanism may be provided to ensure that the camera and the LCD screen are placed into, and remain in, the correct scanning position during scanning operations or "scan mode" of the notebook computer.

During scanning operations or "scan mode", the LCD display screen of the notebook computer may be dynamically lit using a particular gradient of white-light that results in substantially uniform lighting at all positions of the document to be scanned. For example, the brightness of the LCD screen and the black to white gradient intensity may be dependant on the distance of each individual light source pixel of the display screen from the document. In such an example case, pixels towards the top of the LCD display screen (and thus farther away from the document) will be at relatively higher (e.g., maximum) brightness level, while pixels towards the bottom of the LCD display screen (and thus closer to the document) will be at a relatively lower (e.g., dimmer) brightness level.

The disclosed systems and methods may be implemented using software running on a CPU or other processor (e.g., embedded processor) of a portable information handling system to control the display lighting intensity of the portable information handling system so that it varies across the display screen in a manner that at least partially compensates for differences in image quality of the scanned document caused by varying distance of portions of the document from the light source of the display, e.g., by producing substantially uniform lighting at all positions of the document to be scanned. Variable intensity display lighting templates may be developed beforehand (e.g., during the design and/or production phases of a portable information handling system) to provide default display lighting templates to match particular combinations of camera, display screen, and user input surface geometry. Such default display lighting templates may be stored in memory of the portable information handling system and selected for display during scanning operations, e.g., during "scan mode". Other possible methods include controlling the intensity of individual pixels or backlights of a display panel to produce variable intensity lighting from the display panel. Software may also be provided to allow for calibration of the scanning system in the field (e.g., by a user with a white sheet of paper).

In one respect, disclosed herein is an information handling system configured for document scanning, the information handling system including: a base assembly including an upper surface; and a lid portion hingeably coupled to the base assembly at a hinge line, the lid portion including a display screen and a camera oriented to face the upper surface of the base assembly when the lid portion is brought together with the base assembly around the hinge line. The upper surface of the base assembly may be configured to receive a document to be scanned by the camera and the display screen may be configured to display an image to illuminate the document for scanning by the camera when the lid portion is brought together with the camera to face the upper surface of the base assembly at an angle θ with the document positioned therebetween such that the camera is positioned to capture an image of the document. The information handling system may also be configured to control the display screen to produce an image that varies in brightness intensity across the display screen in a manner that at least partially compensates for differences in illumination of portions of the document by the display screen during scanning caused by varying distance of the portions of the scanned document from the light source of the display screen when the lid portion is positioned relative to the upper surface of the base assembly at the angle θ. The camera may be configured to capture an image of the document while the produced image on the display screen is being displayed to illuminate the document with the lid portion positioned relative to the upper surface of the base assembly at the angle θ.

In another respect, disclosed herein is a method of scanning a document with an information handling system including: providing an information handling system including a base assembly including an upper surface, and a lid portion hingeably coupled to the base assembly at a hinge line, the lid portion including a display screen and a camera oriented to face the upper surface of the base assembly when the lid portion is brought together with the base assembly around the hinge line; positioning a document to be scanned by the camera on the upper surface of the base assembly; positioning the lid portion with the camera to face the upper surface of the base assembly at an angle θ with the document positioned therebetween such that the camera is positioned to capture an image of the document; displaying an image to illuminate the document for scanning by the camera; while the lid portion is positioned relative to the upper surface of the base assembly at the angle θ, controlling the display screen to produce a image to illuminate the document for scanning by the camera, the image varying in brightness intensity across the display screen in a manner that at least partially compensates for differences in illumination of portions of the document by the display screen during scanning caused by varying distance of the portions of the scanned document from the light source of the display screen when the lid portion is positioned relative to the upper surface of the base assembly at the angle θ; and capturing an image of the document with the camera while the produced image is being displayed to illuminate the document with the lid portion positioned relative to the upper surface of the base assembly at the angle θ.

In another respect, disclosed herein is a computer program of instructions embodied in a tangible computer readable medium, the computer program including instructions when executed that are configured to: display an image on a display screen of an information handling system to illuminate a document for scanning by a camera of the information handling system when the display screen is positioned relative to a plane of the document at an angle θ, the image varying in brightness intensity across the display screen in a manner that at least partially compensates for differences in illumination of portions of the document by the display screen during scanning caused by varying distance of the portions of the scanned document from the light source of the display screen when the display screen is positioned relative to a plane of the document at the angle θ; and capture an image of the document with the camera while the produced image is being displayed to illuminate the document with the display screen positioned relative to a plane of the document at the angle θ.

DESCRIPTION OF ILLUSTRATIVE EMBODIMENTS

Figure 1:
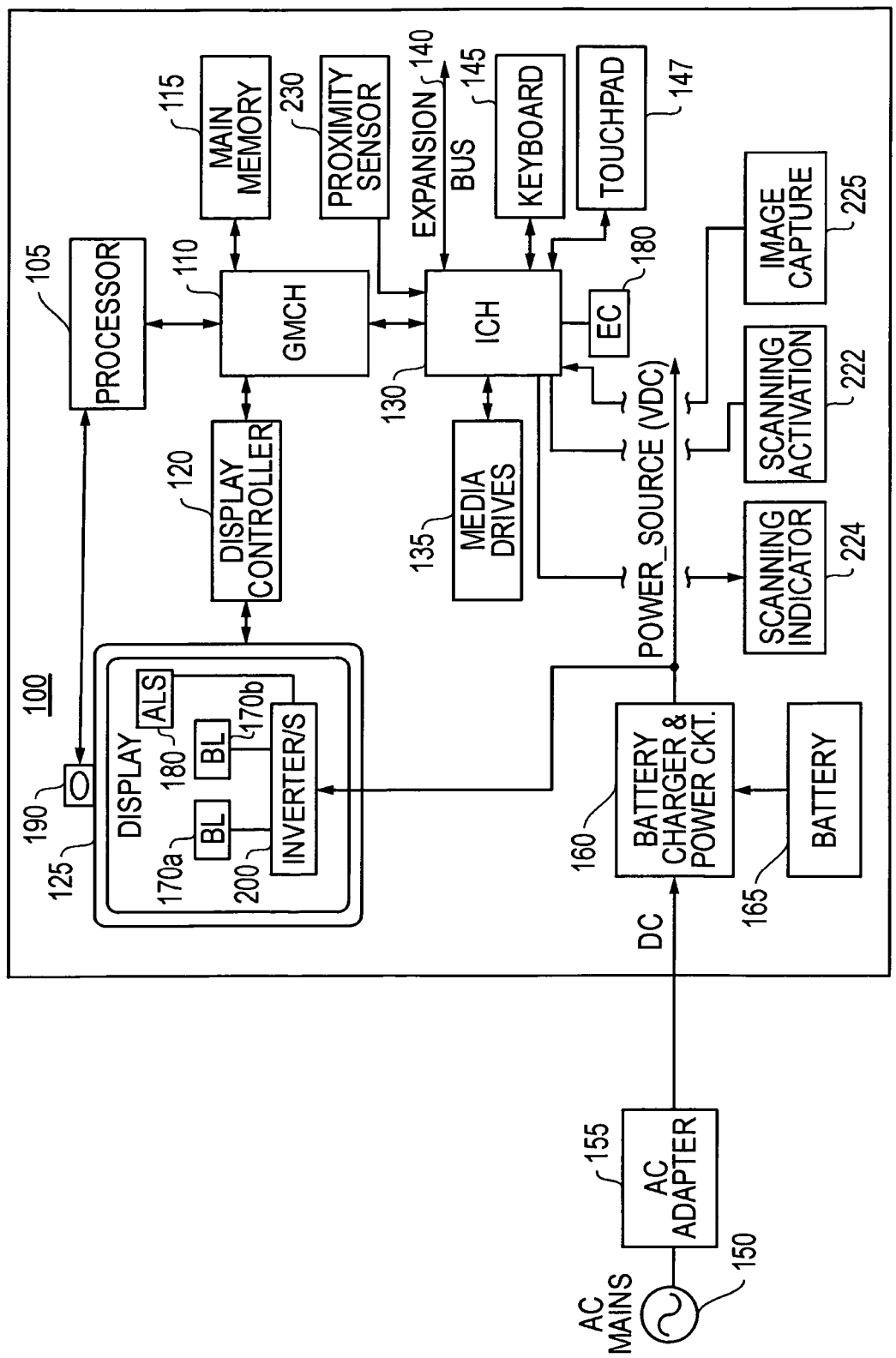
FIG. 1 is a simplified block diagram of an information handling system configured according to one exemplary embodiment of the disclosed systems and methods.

FIG. 1 is a block diagram of an information handling system 100 as it may be configured according to one exemplary embodiment of the disclosed systems and methods for scanning of documents, e.g., text documents, photographic documents, etc. In this embodiment, information handling system 100 may be characterized as a portable information handling system having an integral and adjustable display device, such as a notebook computer. However, it will be understood that disclosed systems and methods may be implemented with any type of information handling system (desktop information handling system, etc.) having a display screen to utilize variable display lighting intensity to achieve image lighting uniformity for document scanning by an integrated or display-attached camera.

As shown in FIG. 1, information handling system 100 of this exemplary embodiment includes a processor (e.g., CPU) 105 such as an Intel Pentium series processor, an Advanced Micro Devices (AMD) processor or one of many other processors currently available. A graphics/memory controller hub (GMCH) chip 110 is coupled to processor 105 to facilitate memory and display functions. System memory 115 and a display controller 120 are coupled to GMCH 110. A display 125 (e.g., LCD display or other suitable display device) is coupled to display controller 120 to provide visual images to the user. An I/O controller hub (ICH) chip 130 is coupled to GMCH chip 110 to facilitate input/output functions for the information handling system. Media drives 135 are coupled to ICH chip 130 to provide permanent storage to the information handling system. An expansion bus 140 is coupled to ICH chip 130 to provide the information handling system with additional plug-in functionality. Expansion bus 140 may be a PCI bus, PCI Express bus, SATA bus, USB or virtually any other expansion bus. Input devices such as a keyboard 145 and touchpad 147 are coupled to ICH chip 130 to enable the user to interact with the information handling system. An embedded controller (EC) 180 running system BIOS is also coupled to ICH chip 130.

In this particular embodiment, information handling system 100 is coupled to a source of AC power, namely AC mains

150. An AC adapter 155 is coupled between AC mains 150 and a battery charger/power circuit 160 to provide information handling system 100 with a source of DC power to supplement DC power provided by battery 165. As shown, display 125 of this exemplary embodiment includes one or more inverter devices 200 which are coupled to multiple backlights 170a and 170b, e.g., for backlighting LCD display panel within display 125. Although an LCD display type panel with multiple backlights are described for this exemplary embodiment, it will be understood that any other configuration of backlights and/or display panel technology may be employed that is suitable for producing lighted images of variable intensity in a manner as described elsewhere herein.

FIG. 1 also illustrates optional an optional ambient light sensor 180 as it may present for providing a real-time signal representative of ambient light conditions to which display 125 is currently exposed. In such a configuration, ALS 180 may be employed to detect the brightness level of the environment in which the user and display is operating and provide this information to controller components of inverter devices 200 of information handling system 100. Alternatively, ALS 180 may provide detected brightness level signal to other processing component/s of information handling system 100, e.g., EC 180 or other suitable processor component. Information handling system 100 may be in turn configured to automatically provide increased display brightness from display 125 when the display is exposed to higher ambient brightness levels (e.g., such as outdoors in sunlight), and to provide decreased display brightness from display 125 when the display is exposed to lower ambient brightness levels (e.g., such as indoors in an office of home environment).

As shown, information handling system 100 of FIG. 1 also includes a camera 190 that is mounted on or integral to display 125. Camera 190 may be, for example, a Charge Coupled Device (CCD) based camera device, complementary metal-oxide semiconductor (CMOS) based camera device, or any other suitable type of camera for capturing images and providing digital image data to processor 105 for further processing. Processor 105 may also be configured to control operation of camera 190, e.g., for selectably providing power or otherwise controlling capture of still or moving images with camera 190. Also shown in FIG. 1 are optional scanning calibration input 222, scanning position indicator 224, proximity sensor 230 and image capture input 225 any one or more of which may be provided to facilitate document scanning operations in a manner as will be described further herein.

Figure 2:
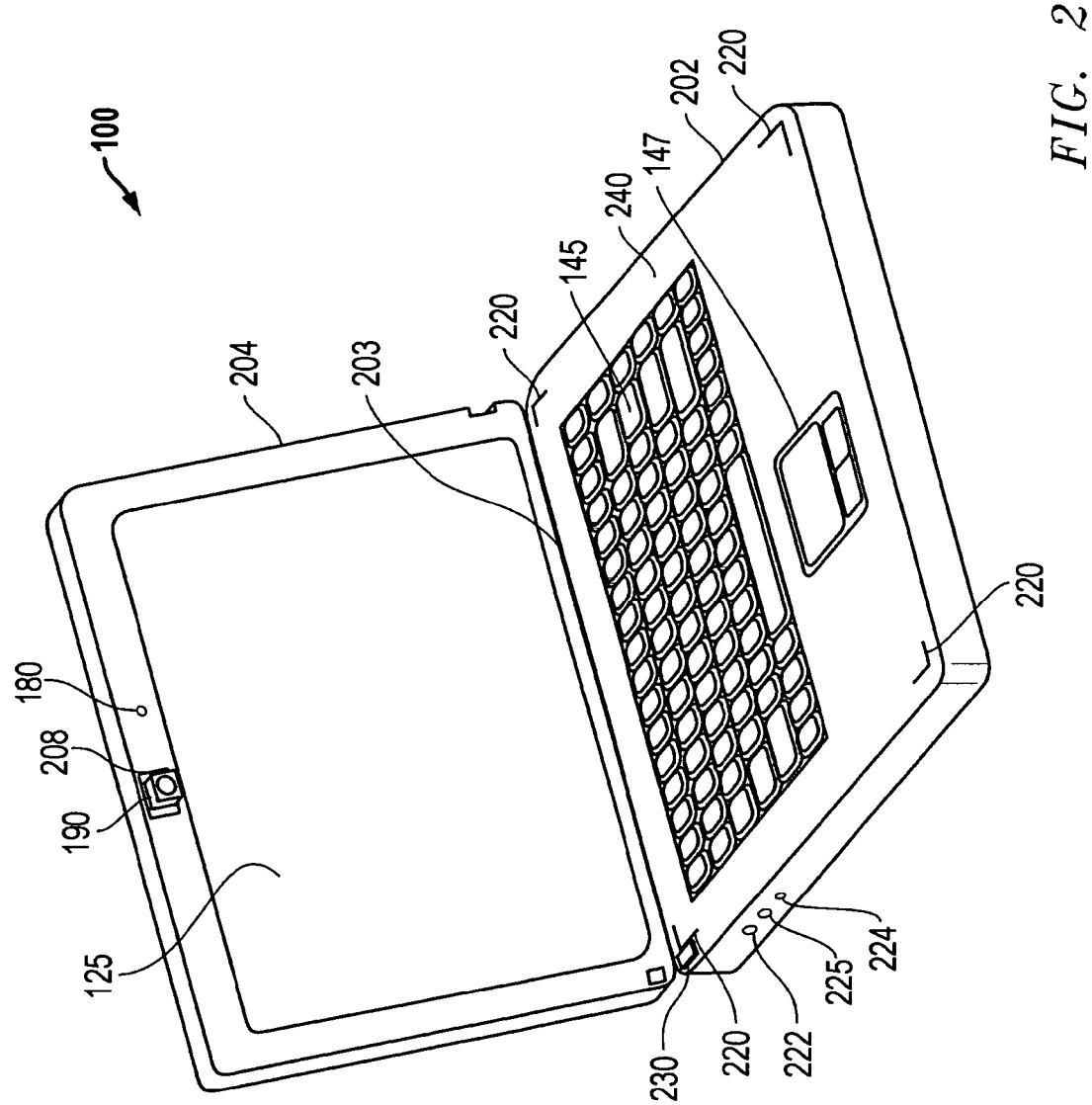
FIG. 2 is a perspective view of an information handling system configured as a notebook computer according to one exemplary embodiment of the disclosed systems and methods.

FIG. 2 is a perspective view of information handling system 100 configured as a notebook computer according to one exemplary embodiment of the disclosed systems and methods. As shown, notebook computer 100 includes a lid portion 204 that is hingeably coupled to a base assembly 202 at a hinge line 203 by a hinge mechanism, and display 125, camera 190 and ALS 180 of notebook computer 100 are each integrated within lid portion 204. In FIG. 2, notebook computer 100 is shown with lid portion 204 in a first unfolded or open condition relative to base assembly 202 to allow normal input and viewing operations by a user (e.g., to allow user input via keyboard 145 and touchpad assembly 147, to allow user viewing of documents and web pages on display 125, to allow video or photographic capture by camera 190 of a user positioned in front of display 125, etc.) and conversion to desired scanned document file type (e.g., PDF, TIF, GIF, JPG, etc.) by processor 105 and/or other components of information handling system 100.

Figure 4:
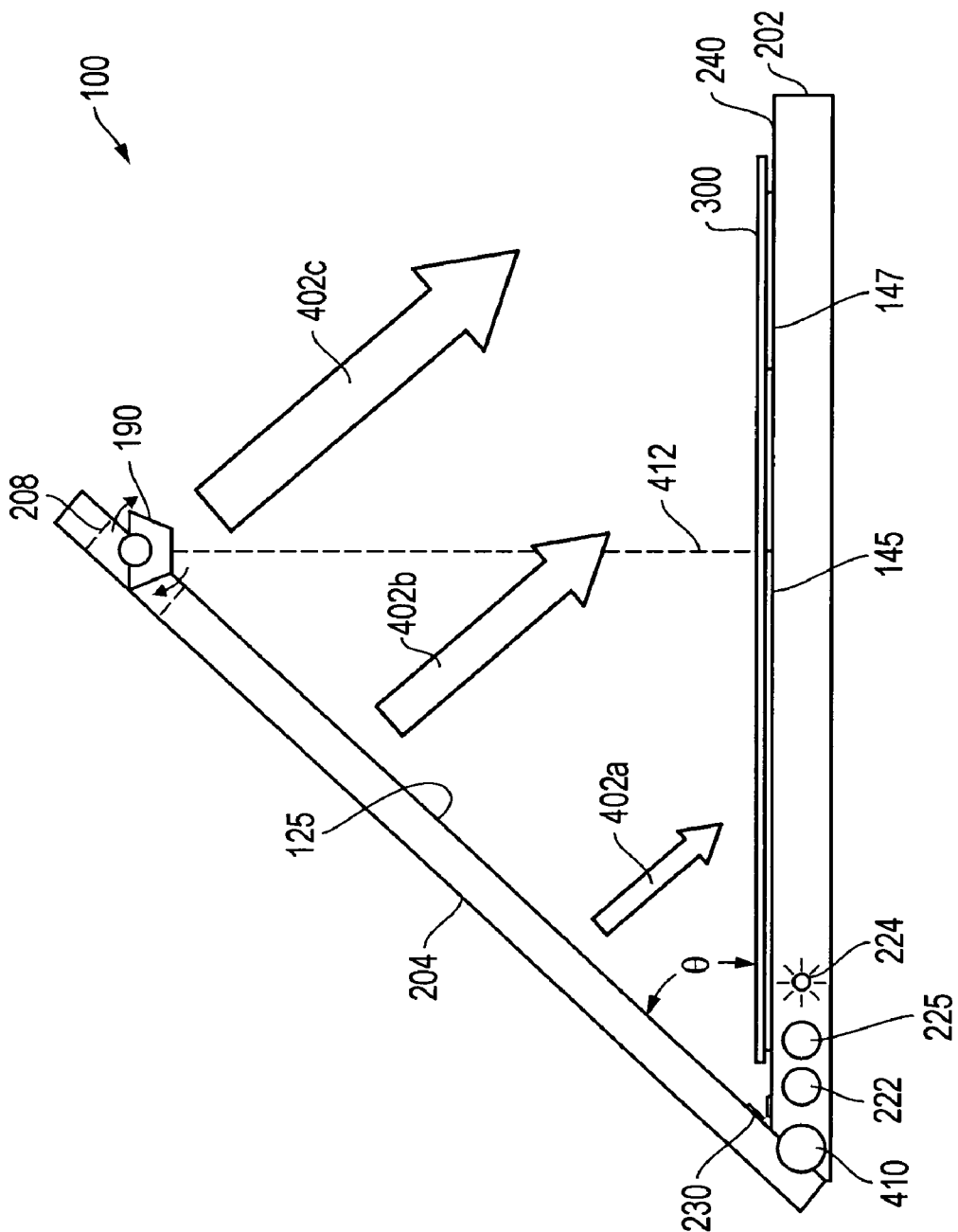
FIG. 4 is a perspective view of an information handling system configured as a notebook computer according to one exemplary embodiment of the disclosed systems and methods.

In this embodiment, camera 190 is an adjustable assembly that is capable of articulation (e.g., rotation) in a downward direction toward base assembly 202 within camera cavity 208 that is defined within lid portion 204, as further shown in FIG. 4. However, it will be understood that any other configuration of camera may be provided that is suitable for articulation in a downward direction toward base assembly 202 may be alternatively employed. Alternatively, a camera may be provided that is permanently oriented of fixed with lid portion 204 so as to be in correct orientation for scanning when lid portion 204 is folded to scanning position.

Still referring to FIG. 2, base assembly 202 of notebook computer 100 is provided with an upper user input surface 240 that in this case includes a keyboard 145 and touchpad assembly 147 with touchpad buttons for user input purposes, although additional or alternative types of user input devices may be present on upper user input surface 240. User input surface 240 also is provided as shown with optional document alignment features 220 (e.g., corresponding to the outer four corners of a standard 8.5"×11" paper sheet, a standard A4 paper sheet, etc.). Alignment features 220 may be provided as physical features (e.g., raised strips or bars) or may be indicia provided to assist a user in positioning a document to be scanned in proper alignment with camera 190 for scanning in a manner as described further herein. In this regard, multiple indicia may be provided for aligning different sizes of paper and/or other types of documents such as photographs, etc. Also shown in FIG. 2 are optional scanning calibration input 222, scanning position indicator 224, proximity sensor 230 and image capture 225, the functions of which will be further described herein.

Figure 3:
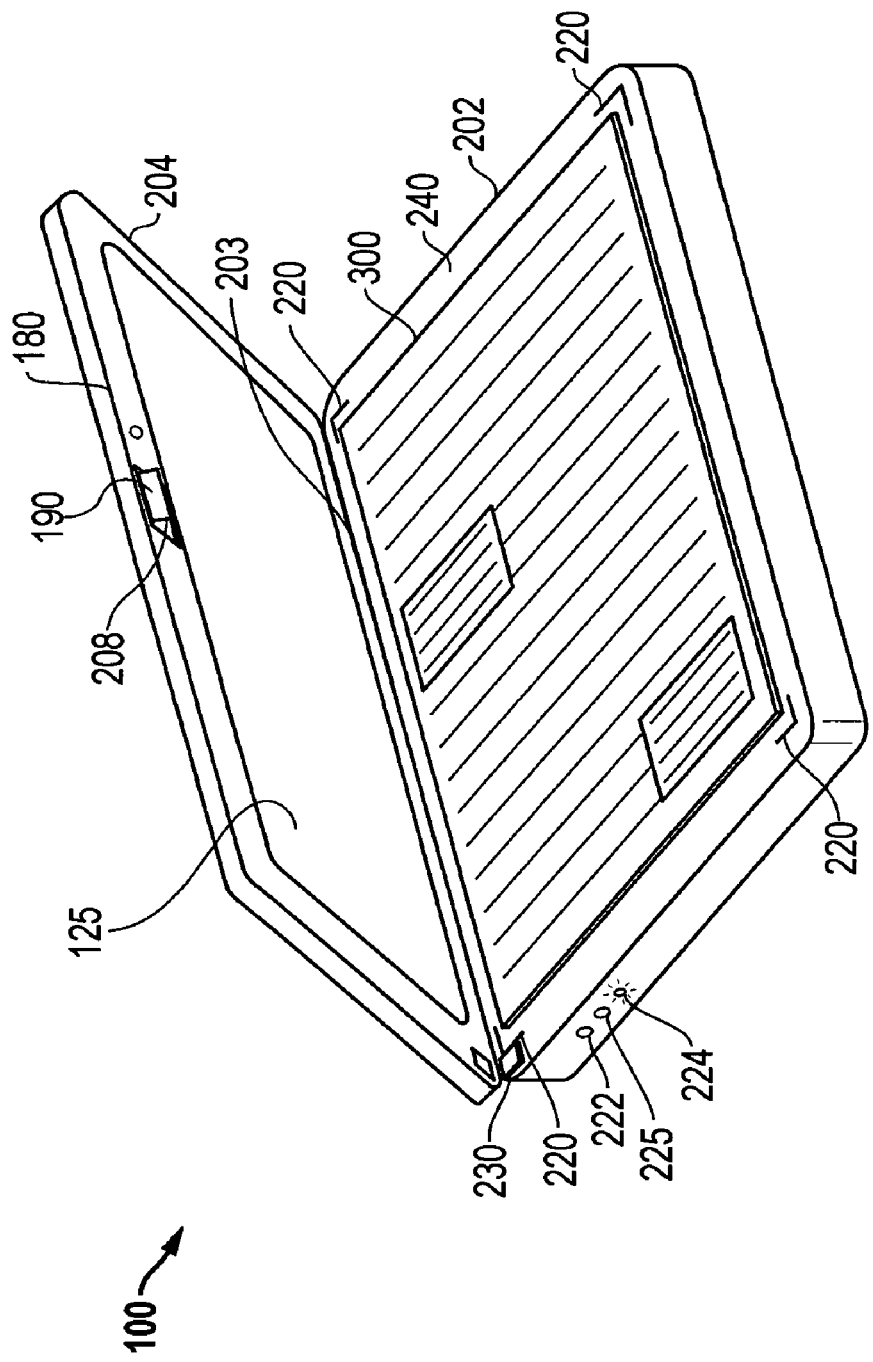
FIG. 3 is a perspective view of an information handling system configured as a notebook computer according to one exemplary embodiment of the disclosed systems and methods.

FIGS. 3 and 4 show notebook computer 100 with the plane of lid portion 204 deployed in a second position at an angle θ relative to a plane of user input surface 240 of base assembly and a plane of a document 300 (e.g., text document) for scanning of the document 300 that is positioned face up for scanning on top of user input surface 240 and aligned for scanning by document alignment features 220. I/O devices of user input surface 240 are recessed as shown (e.g., so that upper user interface 240 is substantially planar across its depth and width) so as to allow document 300 to lie substantially flat across user input surface 240. As shown in FIGS. 3 and 4, lid portion 204 and integral display are folded downward over user input surface 240 and document 300 to place camera 190 substantially centered over document 300. Camera 190 is in turn articulated (as indicated by the arrows) and optionally locked in position within camera cavity 208 to face vertically downward over document 300 for scanning relative to the perpendicular-oriented or horizontal user input surface 240, as shown in FIG. 3. In this regard, an optional locking hinge 410 (e.g., spring-loaded key or pin that is biased perpendicularly inward toward a hinge axle of the lid portion and into a corresponding recess provided in the hinge axle so that the key locks into the recess when the lid portion is position at the correct angle θ, other types of mechanical stop/s, etc.) may be provided that temporarily mechanically locks or snaps hinges of lid portion 204 in a pre-selected scanning position at the correct angle θ, e.g., so that the axis 412 of the lens of camera 190 is substantially aligned over the center point of user input surface 240 when camera 190 is oriented to face downward over document 300. In a case where document 300 is centered on user input surface 240, camera 190 will also be substantially aligned over the center point of document 300, although this is not necessary.

It will be understood that the optimum scanning angle θ will vary according to factors such as the particular lid portion/base assembly geometry, form factor of a given information handling system, downward looking camera lens axis angle, camera placement on a lid portion of an information handling system, etc. In one exemplary embodiment, optimum scanning angle θ may be from about 45 degrees to about 65 degrees, although greater and lesser values of angle θ may be employed.

Referring to FIG. 4, when lid portion 204 is so deployed in the second position at angle θ relative to base assembly 202, display 125 emits light 402 at varying distance from user input surface 240 and document 300 to illuminate document 300 for video or still frame capture by camera 190. As such, a uniformly lit display 125 will not uniformly light document 300 for capture by camera 190. Instead, the portions of document 300 that are closer to display 125 will be more brightly lit, and the portions of document 300 that are farther from display 125 will be more dimly lit. To compensate for such distance-induced variations in lighting intensity, display 125 of FIG. 4 is shown emitting light 402 of varying intensity toward user input surface 240 and document 300 thereon such that light 402 is emitted by each given portion (e.g., each pixel or each group of pixels) of display 125 at an intensity that is inversely proportional to the relative distance of that given portion of display 125 from user input surface/document 300 as compared to the distance of other portions of display 125 from user input surface/document 300. This is illustrated in FIG. 4, which shows relatively lower intensity light 402a being emitted from the lower portions of display 125 that are positioned more closely to user input surface 240/document 300, relatively higher or increased intensity light 402c being emitted from top portions of display 125 that are positioned further away from user input surface 240/document 300, and light 402b of moderate intensity being emitted from portions of display 125 that are positioned at distances therebetween relative to user input surface 240/document 300. Due to the varying intensity gradient at which light in FIG. 4 is emitted toward document 300 by display 125, the light arrives with relatively uniform brightness at and across document 300.

As shown in FIGS. 2-4, one or more optional features may be provided to assist a user in proper positioning of lid portion 204 relative to base assembly 202 for scanning, and/or for controlling the scanning operation itself. For example, proximity sensor 230 may be provided as shown to sense when lid portion 204 is correctly positioned relative to base assembly 202 for scanning, and to trigger scanning position indicator 224 (e.g., LED lamp, buzzer or other suitable indicator) to indicate this proper lid positioning condition to the user. Scanning calibration input 222 (e.g., switch or button on side of notebook computer 100) may be provided to allow a user to activate scanning software and/or firmware that is executed at an application level on CPU 105 (or by embedded controller/processor (EC) 180) of information handling system 100 to interface with video and camera drivers of information handling system 100 cause the display to enter an optional scanning calibration operation mode as described further herein. Image capture input 225 (e.g., switch or button on side of notebook computer 100) may be provided to allow a user to control the scanning software and/or firmware executing on CPU 105 or EC 180 to cause camera 190 to capture an image of document 300. It will be understood that the particular embodiment of FIGS. 1-4 is exemplary only and that any other suitable form/s of input may be used for scanning calibration and capture including, but not limited to, input via user commands from keyboard 145, touchpad 147, connected mouse, etc.

Display 125 may be controlled to produce variable intensity (gradient) lighting of display 125 so that it varies across the display screen in a manner that at least partially compensates for differences in image quality of the scanned document caused by varying distance of portions of the document from the light source of the display, e.g., by producing substantially uniform lighting at all positions of the document to be scanned. Possible methods for producing such variable intensity lighting of display 125 include, but are not limited to, by using pre-defined image templates that display an image of varying brightness, by dynamically controlling LCD display 125 to produce varying light intensity via direct control of individual pixels, groups of pixels and/or individual display backlights, etc. Information regarding example methods of controlling display light intensity may be found in U.S. patent application Ser. No. 11/821,560 and U.S. patent application Ser. No. 11/906,152, each of which is incorporated herein by reference in its entirety.

In one exemplary embodiment, one or more pre-defined image display templates may be stored within memory 115 of information handling system 100. Each of such templates may be a variable intensity image to be displayed on display 125 during scanning operations that varies in luminance across the display screen when it is displayed in a manner that at least partially compensates for differences in image quality of the scanned document caused by varying distance of portions of the document from the light source of the display during the scanning operations. Such pre-defined image display templates may be, for example, defined for the selected optimum scanning angle θ during calibration of information handling system 100 during production and then loaded into memory 115 of system 100 prior to shipment to the end user.

Figure 5:
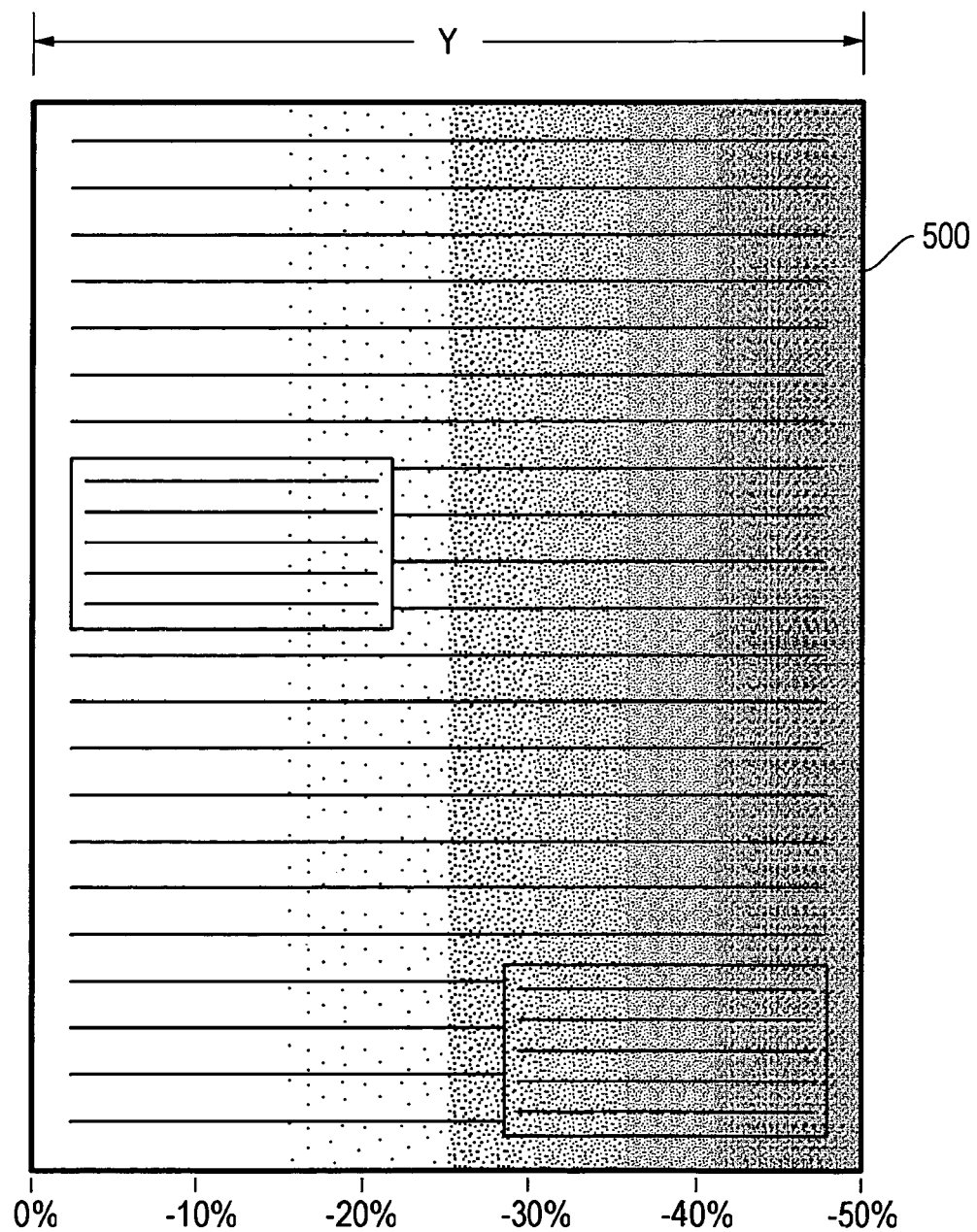
FIG. 5 is a representation of a scanned image of a document from an information handling system of FIGS. 3 and 4 using the light from an image of uniform brightness displayed by a display screen of the display.
Figure 6:
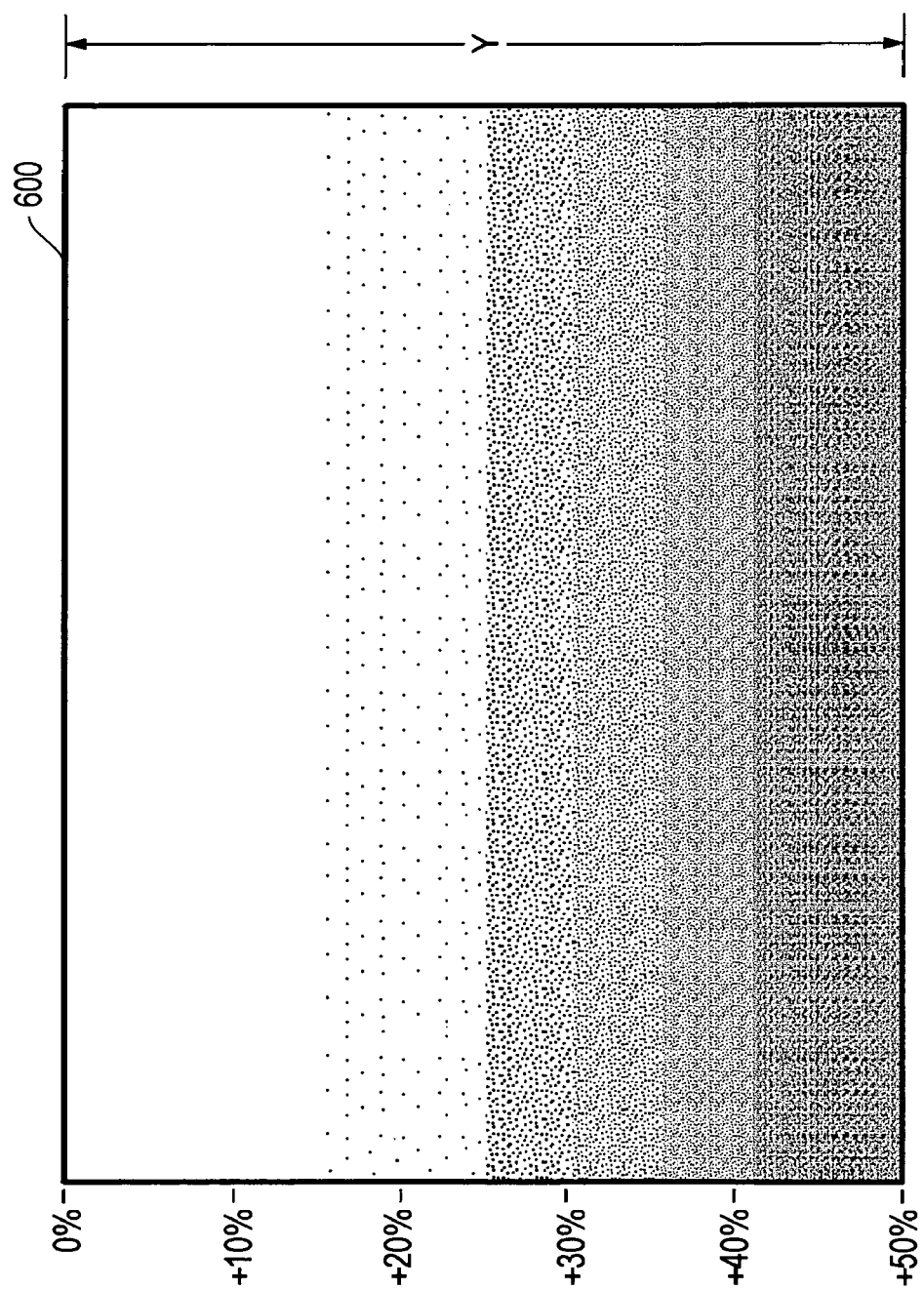
FIG. 6 is a representation of a display image template according to one exemplary embodiment of the disclosed systems and methods.
Figure 7:
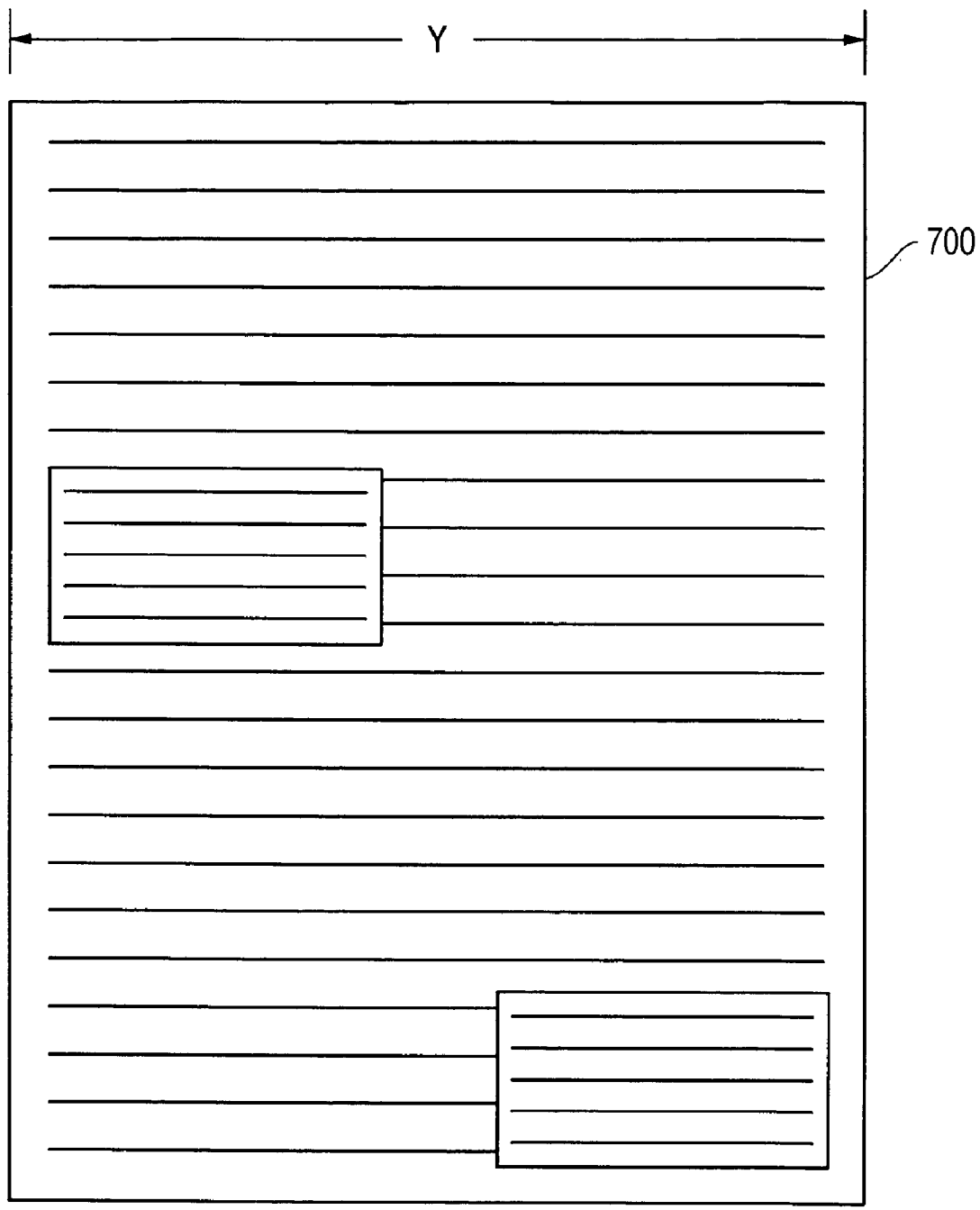
FIG. 7 is a representation of a scanned image according to one exemplary embodiment of the disclosed systems and methods.

For example, FIG. 5 represents a scanned image 500 of document 300 of FIG. 3 that is obtained from camera 190 using the light from an image of uniform brightness (i.e., non-variable intensity) displayed on display 125 with the left side of image 500 being closest to display 125 during scanning and right side of image 500 being farthest from display 125 during scanning. As seen in FIG. 3, image quality of scanned image 500 decreases in luminance by 50% from left to right across the Y-axis. FIG. 6 shows an example display image template 600 that may be pre-defined for use by information handling system 100 during scanning operations to compensate for the differences in image quality of scanned image 500 caused by varying distance of portions of document 300 from the light source of display 125 during scanning. As shown in FIG. 6, image luminance from template 600 decreases by 50% from top to bottom of display 125, e.g., with maximum whiteness being displayed at the top of display 125. FIG. 7 represents a scanned image 500 of document 300 of FIG. 3 that is obtained from camera 190 using the light from an image display template 600 that creates a brightness intensity gradient across display 125 with the left side of image 700 being closest to display 125 during scanning and right side of image 500 being farthest from display 125 during scanning. As seen in FIG. 7, image quality and luminance of scanned image 700 is substantially uniform from left to right across the Y-axis.

It will be understood that multiple image display templates may be pre-defined for use during scanning operations under varying lighting and/or document conditions. For example, a first image display template may be defined that decreases in luminance by 60% from top to bottom of display 125, a second image display template may be defined that decreases in luminance by 50% from top to bottom of display 125, and a third image display template may be defined that decreases in luminance by 40% from top to bottom of display 125.

It will be understood that the foregoing example template luminance gradient values are exemplary only and may vary according to the requirements of a given system. In one exemplary embodiment, pre-defined image display templates may be selected to display an image that illuminates a document with sufficient uniformity so that lighting intensity by the displayed image varies by less than about 20% luminance value across a given document (i.e., maximum luminance versus minimum luminance value) when the document and information handling system components are placed in respective scanning positions. In this regard, a 20% difference in luminance values across a given document has been determined to be the approximate minimum difference in document brightness that the human eye can detect. Such initial template calibration measurements may be made in the lab or factory (e.g., by the designer, manufacturer or assembler of information handling system 100) and a default image template may be pre-selected during design or assembly for initial use.

It will be understood that minimum luminance values other than about 20% may be used as a criteria in alternative embodiments. As will be further described, a user and/or software/firmware application executing on CPU 105 or EC 180 of information handling system 100 may then select which of the pre-defined templates to employ for scanning of a given document under given conditions. Furthermore, image display templates may be provided to have different overall luminance and/or color tone, e.g., to match different colors of documents that are to be scanned.

Figure 8:
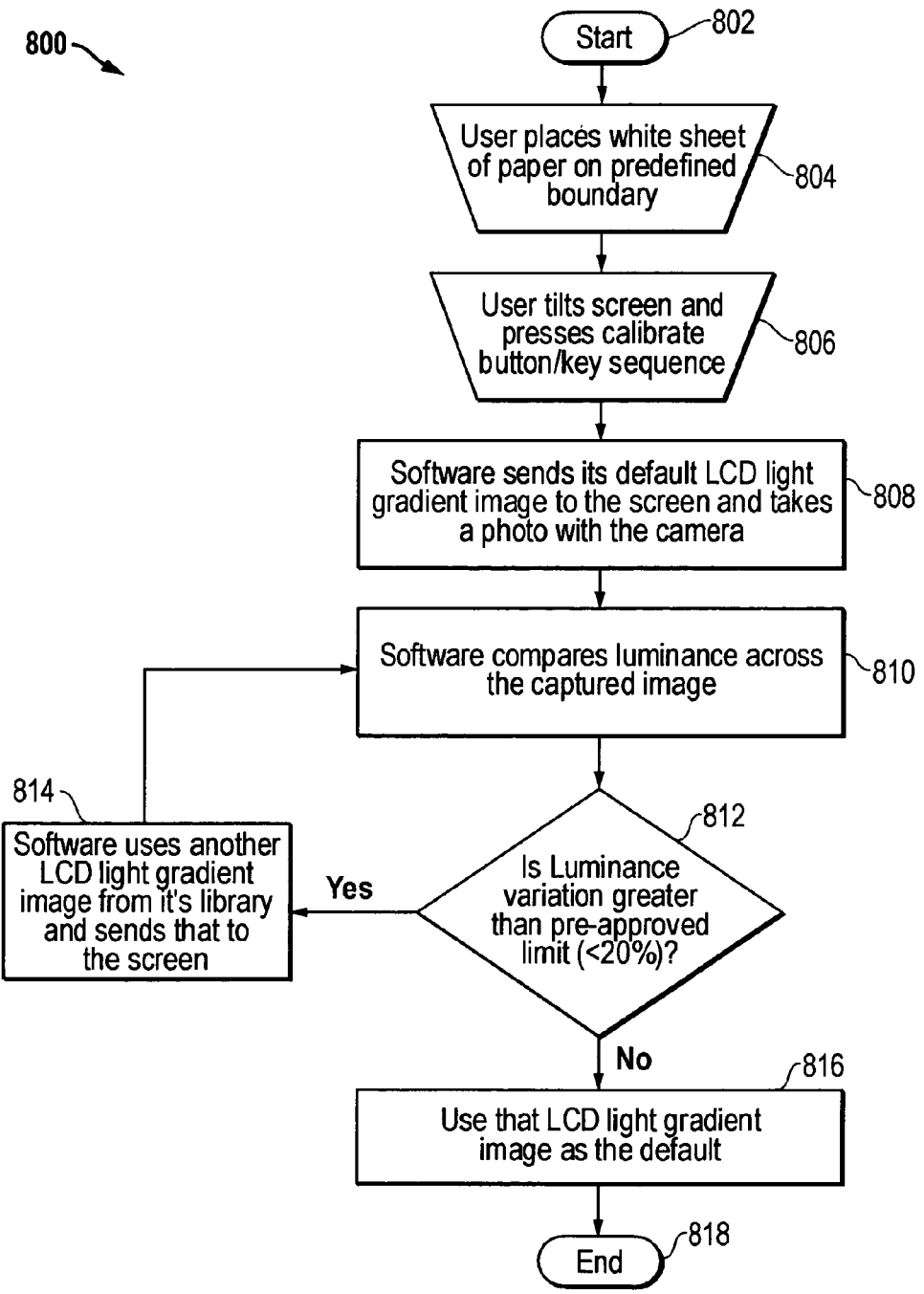
FIG. 8 illustrates methodology according to one exemplary embodiment of the disclosed systems and methods.

FIG. 8 illustrates one exemplary embodiment of methodology 800 that may be employed to employ a scanning calibration mode to select one of multiple available pre-defined image display templates for use in scanning documents with portable information handling system 100 of FIGS. 1-4. Methodology 800 starts in step 802 and moves to step 804 where a user places a calibration document 300 (e.g., blank white sheet of paper) on user input surface 240 within a pre-defined boundary defined by alignment features 220. Next the user ensures that camera 190 is angled to face vertically downward over document 300 for scanning, and tilts the lid portion 204 downward toward base assembly 202 in step 806 until scanning position indicator 224 lights to indicate that lid portion 204 is properly positioned over document 300 for scanning as shown in FIG. 3. Also in step 806 the user initiates the calibration mode, e.g., by pressing calibration input button 222 or by other input command such as via keystrokes or mouse.

In response to activation of the calibration scanning mode in step 806, the scanning software/firmware selects the current default image display template and captures an image of the calibration document 300 in step 808. In step 810, the scanning software/firmware analyzes the luminance across the document image captured in step 808 and compares the maximum luminance value of the captured image to the minimum luminance value of the captured image. In step 812, the scanning software/firmware determines if the luminance variation (maximum luminance versus minimum luminance value) is greater than a pre-defined luminance value threshold, e.g., about 20% in this exemplary embodiment or other selected luminance value threshold. If not, then the current default image display template is maintained as the default template in step 816. However, if it is determined in step 812 that the luminance variation is greater than the pre-defined luminance value threshold, then the scanning software/firmware selects another image display template from the available image display templates in step 814 and repeats step 810 and 812 until the luminance variation criteria is satisfied in step 812 and methodology 800 terminates in step 818. Alternatively or additionally, the image display template that produces the least luminance variation may be selected as the default image display template, e.g., where more than one of the pre-defined image display templates satisfy the luminance variation criteria, or where none of the pre-defined image display templates satisfy the luminance variation criteria.

It will be understood that methodology 800 of FIG. 8 is exemplary only and that fewer, additional and/or alternative steps may be employed by a software/firmware and/or user in other embodiments to calibrate scanning operations by selecting a default image display template that meets the selected luminance variation criteria of a particular application. Furthermore, it will be understood that where optional ALS 180 is present, it may be employed to detect the brightness level of the environment in which the document scanning is occurring and to adjust the overall background brightness of the light source/s (e.g., backlight/s) of display 125, e.g., to automatically provide increased display brightness from display 125 when the display is exposed to higher ambient brightness levels (e.g., such as outdoors in sunlight), and to provide decreased display brightness from display 125 when the display is exposed to lower ambient brightness levels (e.g., such as indoors in an office of home environment).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. An information handling system configured for document scanning, said information handling system comprising:
   a base assembly comprising an upper surface; and
   a lid portion hingeably coupled to said base assembly at a hinge line, said lid portion comprising a display screen and a camera oriented to face said upper surface of said base assembly when said lid portion is brought together with said base assembly around said hinge line;
   wherein said upper surface of said base assembly is configured to receive a document to be scanned by said camera and said display screen is configured to display an image to illuminate said document for scanning by said camera when said lid portion is brought together with said camera to face said upper surface of said base assembly at an angle θ with said document positioned therebetween such that said camera is positioned to capture an image of said document;

wherein said information handling system is configured to control said display screen to produce an image that varies in brightness intensity across said display screen in a manner that at least partially compensates for differences in illumination of portions of said document by said display screen during scanning caused by varying distance of said portions of said scanned document from the light source of said display screen when said lid portion is positioned relative to said upper surface of said base assembly at said angle θ; and wherein said camera is configured to capture an image of said document while said produced image on said display screen is being displayed to illuminate said document with said lid portion positioned relative to said upper surface of said base assembly at said angle θ.

2. The information handling system of claim 1, wherein said information handling system is a portable information handling system; and wherein said upper surface of said base assembly comprises an upper user input surface configured with one or more user input devices.

3. The information handling system of claim 1, wherein said information handling system comprises a notebook computer; and wherein said upper surface of said base assembly comprises a keyboard.

4. The information handling system of claim 3, further comprising at least one alignment feature defined on said upper surface of said base assembly, said alignment feature being configured to facilitate alignment of said document with said camera for said scanning by said camera.

5. The information handling system of claim 1, wherein said camera is configured to articulate in a downward direction toward said base assembly when said lid portion is positioned relative to said upper surface of said base assembly at said angle θ so that an axis of a lens of said camera is substantially perpendicular to a plane of said document to be scanned by said camera and so that said axis of said lens of said camera is substantially alignable over the center point of said document to be scanned.

6. The information handling system of claim 1, wherein said information handling system is further configured to display a first pre-defined image display template on said display screen to produce said image that varies in brightness intensity across said display screen in a manner that at least partially compensates for differences in illumination of portions of said document by said display screen during scanning caused by varying distance of said portions of said scanned document from the light source of said display screen when said lid portion is positioned relative to said upper surface of said base assembly at said angle θ; and to capture an image of said document while said first pre-defined image display template is displayed on said display screen.

7. The information handling system of claim 6, wherein said information handling system is further configured to:

analyze the luminance across a document image captured by said camera while said first pre-defined image display template is displayed on said display screen with said lid portion positioned relative to said upper surface of said base assembly at said angle θ;

determine luminance difference between the maximum luminance value of said captured image and the minimum luminance value of the captured image;

compare said determined luminance difference to a pre-defined luminance threshold; and use said first pre-defined image display template as a default image display template for future scanning operations if said determined luminance difference is less than or equal to said pre-defined luminance threshold, or select another pre-defined image display template as a default image display template for future scanning operations if said determined luminance difference is greater than said pre-defined luminance threshold.

8. The information handling system of claim 1, further comprising a locking mechanism configured to temporarily lock said lid portion in position relative to said upper surface of said base assembly at said angle θ.

9. The information handling system of claim 1, further comprising a proximity sensor and a scanning position indicator; and wherein said information handling system is configured to:

use a signal from said proximity sensor to sense when said lid portion is positioned at said angle θ relative to said upper surface of said base assembly; and activate said scanning position indicator when said signal from said proximity sensor indicates that said lid portion is positioned at said angle θ relative to said upper surface of said base assembly.

10. A method of scanning a document with an information handling system comprising:

providing an information handling system comprising a base assembly comprising an upper surface, and a lid portion hingeably coupled to said base assembly at a hinge line, said lid portion comprising a display screen and a camera oriented to face said upper surface of said base assembly when said lid portion is brought together with said base assembly around said hinge line;

positioning a document to be scanned by said camera on said upper surface of said base assembly;

positioning said lid portion with said camera to face said upper surface of said base assembly at an angle θ with said document positioned therebetween such that said camera is positioned to capture an image of said document;

displaying an image to illuminate said document for scanning by said camera;

while said lid portion is positioned relative to said upper surface of said base assembly at said angle θ, controlling said display screen to produce a image to illuminate said document for scanning by said camera, said image varying in brightness intensity across said display screen in a manner that at least partially compensates for differences in illumination of portions of said document by said display screen during scanning caused by varying distance of said portions of said scanned document from the light source of said display screen when said lid portion is positioned relative to said upper surface of said base assembly at said angle θ; and capturing an image of said document with said camera while said produced image is being displayed to illuminate said document with said lid portion positioned relative to said upper surface of said base assembly at said angle θ.

11. The method of claim 10, wherein said information handling system is a portable information handling system; and wherein said upper surface of said base assembly comprises an upper user input surface configured with one or more user input devices.

12. The method of claim 10, wherein said information handling system comprises a notebook computer; and wherein said upper surface of said base assembly comprises a keyboard.

13. The method of claim 10, further comprising articulating said camera in a downward direction toward said base assembly when said lid portion is positioned relative to said upper surface of said base assembly at said angle θ so that an axis of a lens of said camera is substantially perpendicular to a plane of said document to be scanned by said camera and so that said axis of said lens of said camera is substantially aligned over the center point of said document to be scanned that is positioned on said upper surface of said base assembly.

14. The method of claim 10, further comprising displaying a first pre-defined image display template on said display screen to produce said image that varies in brightness intensity across said display screen in a manner that at least partially compensates for differences in illumination of portions of said document by said display screen during scanning caused by varying distance of said portions of said scanned document from the light source of said display screen when said lid portion is positioned relative to said upper surface of said base assembly at said angle θ; and capturing an image of said document while said first pre-defined image display template is displayed on said display screen.

15. The method of claim 14, further comprising:
analyzing the luminance across said document image captured by said camera while said first pre-defined image display template is displayed on said display screen with said lid portion positioned relative to said upper surface of said base assembly at said angle θ;
determining luminance difference between the maximum luminance value of said captured image and the minimum luminance value of said captured image of said document;
comparing said determined luminance difference to a pre-defined luminance threshold; and
using said first pre-defined image display template as a default image display template for future scanning operations if said determined luminance difference is less than or equal to said pre-defined luminance threshold, or selecting another pre-defined image display template as a default image display template for future scanning operations if said determined luminance difference is greater than said pre-defined luminance threshold.

16. The method of claim 10, further comprising using a display locking mechanism to temporarily lock said lid portion in position relative to said upper surface of said base assembly at said angle θ.

17. The method of claim 10, wherein said information handling system further comprises a proximity sensor and a scanning position indicator; and wherein said method further comprises:
using a signal from said proximity sensor to sense when said lid portion is positioned at said angle θ relative to said upper surface of said base assembly; and
activating said scanning position indicator when said signal from said proximity sensor indicates that said lid portion is positioned at said angle θ relative to said upper surface of said base assembly.

18. A computer program of instructions embodied in a non-transitory tangible computer readable medium, said computer program comprising instructions embodied in the non-transitory tangible computer readable medium that when executed are configured to:
display an image on a display screen of an information handling system to illuminate a document for scanning by a camera of said information handling system when said display screen is positioned relative to a plane of said document at an angle θ, said image varying in brightness intensity across said display screen in a manner that at least partially compensates for differences in illumination of portions of said document by said display screen during scanning caused by varying distance of said portions of said scanned document from the light source of said display screen when said display screen is positioned relative to a plane of said document at said angle θ; and
capture an image of said document with said camera while said produced image is being displayed to illuminate said document with said display screen positioned relative to a plane of said document at said angle θ.

19. The computer program of claim 18, further comprising instructions embodied in the non-transitory tangible computer readable medium that when executed are configured to:
display a first pre-defined image display template on said display to produce said image that varies in brightness intensity across said display in a manner that at least partially compensates for differences in illumination of portions of said document by said display during scanning caused by varying distance of said portions of said scanned document from the light source of said display when said display screen is positioned relative to a plane of said document at said angle θ; and
capture an image of said document while said first pre-defined image display template is displayed on said display.

20. The computer program of claim 19, further comprising instructions embodied in the non-transitory tangible computer readable medium that when executed are configured to:
analyze the luminance across said document image captured by said camera while said first pre-defined image display template is displayed on said display with said display screen is positioned relative to a plane of said document at an angle θ;
determine luminance difference between the maximum luminance value of said captured image and the minimum luminance value of said captured image of said document;
compare said determined luminance difference to a pre-defined luminance threshold; and
use said first pre-defined image display template as a default image display template for future scanning operations if said determined luminance difference is less than or equal to said pre-defined luminance threshold, or select another pre-defined image display template as a default image display template for future scanning operations if said determined luminance difference is greater than said pre-defined luminance threshold.

* * * * *